United States Patent
Ureche et al.

(10) Patent No.: US 8,387,109 B2
(45) Date of Patent: Feb. 26, 2013

(54) ACCESS CONTROL STATE DETERMINATION BASED ON SECURITY POLICY AND SECONDARY ACCESS CONTROL STATE

(75) Inventors: Octavian T. Ureche, Renton, WA (US); Alex M. Semenko, Issaquah, WA (US); Ping Xie, Redmond, WA (US); Sai Vinayak, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 585 days.

(21) Appl. No.: 12/256,742

(22) Filed: Oct. 23, 2008

(65) Prior Publication Data
US 2010/0107213 A1  Apr. 29, 2010

(51) Int. Cl.
*G06F 17/00* (2006.01)
*H04L 29/06* (2006.01)

(52) U.S. Cl. .......... 726/1; 726/2; 726/4; 726/5; 726/16; 726/21; 726/26; 726/27; 726/29; 711/100; 713/182; 713/183; 713/184; 713/185; 713/166; 707/694; 707/695

(58) Field of Classification Search .......... 726/3
See application file for complete search history.

(56) References Cited

U.S. PATENT DOCUMENTS

| | | | |
|---|---|---|---|
| 7,027,463 B2 * | 4/2006 | Mathew et al. | 370/463 |
| 7,257,835 B2 | 8/2007 | Jones | |
| 7,350,226 B2 | 3/2008 | Moriconi et al. | |
| 2003/0177389 A1 * | 9/2003 | Albert et al. | 713/201 |
| 2004/0177270 A1 | 9/2004 | Little et al. | |
| 2005/0185789 A1 * | 8/2005 | Goodwin | 380/1 |
| 2006/0021057 A1 * | 1/2006 | Risan et al. | 726/26 |
| 2006/0236408 A1 | 10/2006 | Yan | |
| 2006/0253445 A1 | 11/2006 | Huang et al. | |
| 2006/0294575 A1 * | 12/2006 | Rogers | 726/1 |
| 2007/0074292 A1 * | 3/2007 | Mimatsu | 726/26 |
| 2007/0174634 A1 * | 7/2007 | Plotkin et al. | 713/189 |
| 2008/0066147 A1 | 3/2008 | Dillaway et al. | |
| 2010/0211802 A1 * | 8/2010 | Humphries et al. | 713/193 |

OTHER PUBLICATIONS

Vogt, Gerald, "Multiple Authorization", Retrieved at <<http://citeseerx.ist.psu.edu/viewdoc/summary?doi=10.1.1.13.8500>>, pp. 1-4.
"Securities Best Practice for Cascade Server Administrators", Retrieved at <<http://www.hannonhill.com/new-kb/articles/securities/>>, Aug. 19, 2008, pp. 2.
Crampton, et al., "The Secondary and Approximate Authorization Model and its Application to Bell-Lapadula Policies", Retrieved at <<http://www.isg.rhul.ac.uk/~jason/Pubs/sacmat06.pdf>>, SACMAT'06, Jun. 7-9, 2006, Lake Tahoe, California, pp. 10.
"ProCurve Access Control Server 745wl", Retrieved at <<http://www.hp.com/rnd/pdfs/datasheets/ProCurve_Access_Control_Server_745wl.pdf>>, Jul. 18, 2006, pp. 5.

* cited by examiner

*Primary Examiner* — Nathan Flynn
*Assistant Examiner* — Bryan Wright
(74) *Attorney, Agent, or Firm* — Wolfe-SBMC

(57) ABSTRACT

In accordance with one or more aspects, a current security policy for accessing a device or volume of a computing device is identified. A secondary access control state for the device or volume is also identified. An access state for the device is determined based on both the current security policy and the secondary access control state.

20 Claims, 6 Drawing Sheets

ACCESS CONTROL STATE DETERMINATION BASED ON SECURITY POLICY AND SECONDARY ACCESS CONTROL STATE

BACKGROUND

Controlling access to different storage devices that can be plugged into or connected to computers has become a widespread concern for both computer users and computer designers. A variety of different techniques have been developed to control this access. Unfortunately, many of these techniques are problematic due to their being inefficient and cumbersome for the computer designers to implement.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects, a current security policy for accessing a device of a computing device is identified. A secondary access control state for the device is also identified, the secondary access control state being a result of a previous application of a different security policy. An access state for the device is determined based on both the current security policy and the secondary access control state.

In accordance with one or more aspects, a secondary access control state of a volume coupled to a computing device is identified. A current security policy of the computing device is also identified. An access state for the volume is determined based on both the secondary access control state of the volume and the current security policy of the computing device.

In accordance with one or more aspects, a device includes a control module and an access guard. The control module is to obtain a current security policy for the device and a secondary access control state for a volume coupled to the device. The control module is also to determine an access state based on both the secondary access control state of the volume and the current security policy of the device. The access guard is to receive the access state from the control module, and to control access to the volume based on the access state.

BRIEF DESCRIPTION OF THE DRAWINGS

The same numbers are used throughout the drawings to reference like features.

DETAILED DESCRIPTION

Access control state determination based on security policy and secondary access control state is discussed herein. Access to a particular device by a computing device is controlled based on both a current security policy of the computing device and a secondary access state of the particular device. The secondary access is a result of a security policy previously imposed on the particular device. This security policy previously imposed is thus applied in cascade with the current security policy. In a specific example discussed in more detail below, access to a storage device by a computing device is determined based on both the current security policy of the computing device and the secondary access state of the storage device.

Figure 1:
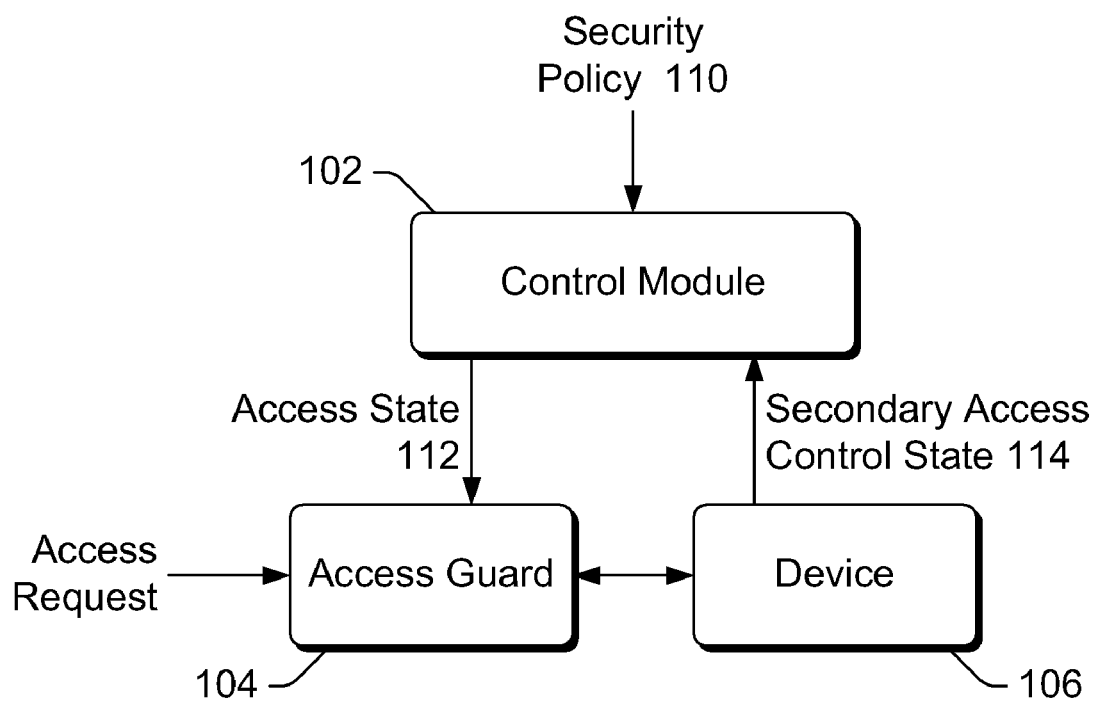
FIG. 1 illustrates an example system employing the access control state determination based on security policy and secondary access control state in accordance with one or more embodiments.

FIG. 1 illustrates an example system 100 employing the access control state determination based on security policy and secondary access control state in accordance with one or more embodiments. System 100 includes a control module 102, access guard 104, and device 106. Control module 102 and access guard 104 are typically implemented by the same computing device, although alternatively can be implemented by different devices. Any of a variety of different types of computing devices can implement module 102 and guard 104, such as a desktop computer, a mobile station, an entertainment appliance, a set-top box communicatively coupled to a display device, a cellular or other wireless phone, a game console, an automotive computer, and so forth. Device 106 is typically a storage device, such as a flash memory device (e.g., a thumb drive), hard drive, optical disc, and so forth. Alternatively, device 106 can be other types of devices (such as a printer, scanner, and so forth), and/or a device or component that is part of the same computing device as implements module 102 and guard 104.

Generally, control module 102 determines an access state (AS) 112 for device 106 and forwards this access state 112 to access guard 104. Access guard 104 uses the access state 112 to impose access control on device 106, such as determining whether requests to access device 106 are permitted or denied. Control module 102 determines the access state 112 based on both a current security policy (SP) 110 for the device requesting access to device 106, and on a secondary access control state (SAS) 114 obtained from device 106. Alternatively, rather than control module 102 determining access state 112, access guard 104 can determine the access state based on security policy 110 and secondary access control state 114.

The current security policy 110 is the security policy imposed on the computing device implementing control module 102. In one or more embodiments, the security policy is a user-based policy. When a user logs into the computing device implementing module 102, a security policy assigned to the user by a system administrator is associated with the user. An example of such a security policy is the Windows® operating system Group Policy service. Alternatively, the security policy can be a device-based policy that applies to all users of the computing device regardless of who the user is and/or whether the user is logged into the computing device.

The secondary access control state 114 obtained from device 106 is the result of a security policy previously imposed on device 106. This previously imposed security policy could have been previously imposed by the computing device implementing control module 102 and/or access guard 104, or alternatively a different device. Additionally, this previously imposed security policy could have been imposed by a control module applying security policy 110, or alternatively a different security policy. The secondary access control state 114 of device 106 describes the access control state of device 106, and is used by control module 102 as discussed below.

Any of a variety of different settings describing the state of device 106 (e.g., whether device 106 is encrypted, an indication that device 106 is in the process of being encrypted, a user that last accessed device 106, one or more groups of which the user that last accessed device 106 was a member, a type of encryption used to encrypt device 106, restrictions on passphrases or other authenticators used to generate a key to encrypt device 106, and so forth), and/or restrictions on accessing device 106 (e.g., which user can access device 106, which groups of users can access device 106, whether read-write access to device 106 is permitted, whether access to device 106 is restricted to read-only access, and so forth) can be recorded as the secondary access control state of device 106. By way of example, the previously imposed security policy could have required device 106 to be encrypted, in response to which device 106 would have been encrypted. An indication that device 106 has been encrypted (or particular portions of device 106 have been encrypted) is maintained as the secondary access control state of device 106. By way of another example, the previously imposed security policy could restrict access to data on device 106 to particular users or groups of users. A record of these particular users or groups of users is maintained as the secondary access control state of device 106.

In one or more embodiments, the access control state determination based on security policy and secondary access control state discussed herein is used with an encryption mechanism to protect information stored on device 106. Any of a variety of different encryption mechanisms can be employed, and information describing the encryption of device 106 is passed to control module 102 as the secondary access state. The encryption mechanism can be a volume-based or drive-based encryption mechanism, such as the BitLocker™ Drive Encryption encryption mechanism available from Microsoft Corporation of Redmond, Wash. In a volume-based or drive-based encryption mechanism, entire volumes and/or drives are encrypted rather than individual files stored on those volumes and/or drives. A volume refers to a particular device (e.g., a flash memory device, a hard drive, an optical disc, etc.), or a portion of a device that is treated logically as a device (e.g., a partition of a hard drive, a portion of a flash memory device, and so forth). Alternatively, other types of volume-based or drive-based encryption mechanisms can be used, or other types of encryption mechanisms with finer granularity (e.g., folder-based encryption mechanisms, file-based encryption mechanisms, and so forth) can be used.

Generally, determining the access state 112 for device 106 can be described using an access state vector $AS(m)$, a secondary access control state vector $SAS(n)$, and a security policy operator $SP(n,m)$. The access state vector $AS(m)$ can be written as $\{AS1, AS2, \ldots, ASm\}$, where each vector element $ASi$ expresses an access state assertion. Any of a variety of different access state assertions can be included in access state vector $AS(m)$, such as indicating whether read-write access to device 106 is permitted, whether access to device 106 is restricted to read-only access, which particular user or group of users is permitted to access device 106, whether data can be sent to device 106, and so forth. Generally, the access state assertions in access state vector $AS(m)$ describe particular accesses to device 106 that are permitted or not permitted.

An example of an access state vector $AS(m)$ includes the following five access state assertions: AS1=read-only access, AS2=read-write access, AS3=authenticated users allowed, AS4=users from group "Foo" denied, and AS5=administrative users allowed. The vector $AS(m)$ is passed from control module 102 to access guard 104 with a setting of "True" or "False" for each of the access state assertions. So, for example, the vector $AS(m)$ could be set to {True, False, True, True, True}, indicating that read-only access is permitted, read-write access is denied, access by authenticated users is permitted, users from group "Foo" are denied access, and access by administrative users is permitted.

The secondary access control state vector $SAS(n)$ can be written as $\{SAS1, SAS2, \ldots, SASn\}$, where each vector element $SASi$ expresses a secondary access control state assertion. Any of a variety of different access control state assertions can be included in secondary access control state vector $SAS(n)$, such as an indication that encryption is turned on for device 106, an indication that encryption is turned off for device 106, an indication that encryption of device 106 has been completed, an indication that encryption of device 106 is in process, an indication of particular users or groups of users that are permitted or prohibited from accessing device 106, and so forth. Generally, the access control state assertions in secondary access control state vector $SAS(n)$ describe a particular aspect of access control previously imposed on device 106.

An example of a secondary access control state vector $SAS(n)$ includes the following six state assertions: SAS1=volume protection turned off, SAS2=volume protection turned on, SAS3=volume encryption incomplete, SAS4=volume encryption complete, SAS5=volume encryption suspended, and SAS6=volume encryption resumed. The vector $SAS(n)$ is passed from device 106 to control module 102 with a setting of "True" or "False" for each of the state assertions. So, for example, the vector $SAS(n)$ could be set to {True, False, False, False, False, False}, indicating that volume protection is turned off.

The security policy operator $SP(n,m)$ applies the current security policy 110 to the secondary access control state 114 of device 106 to generate access state 112. The current security policy 110 defines an access state for each valid secondary access control state 114. Accordingly, the security policy operator $SP(n,m)$ uses the secondary access control mechanisms state vector $SAS(n)$ to identify the corresponding access state defined by the current security policy 110, and forwards this identified access state to access guard 104 as access state 112.

In one or more embodiments, an additional secondary access control state transition operator is used to identify what is to occur in order for the secondary access control state to transition from one state to another. This secondary access control state transition operation can be referred to as $SAST(n,n)$, and when applied to a vector $SAS(n)$ produces a new vector $SAS'(n)$. The secondary access control state can be transitioned from one state to another by a component or module (e.g., control module 102) altering or changing device 106 in some manner, such as encrypting device 106, decrypting device 106, altering which users or groups are to be permitted to access device 106, and so forth.

It should be noted that one or more of the different access control state assertions included in the secondary access state can be set by different entities and/or at different times. For example, a first assertion indicating that encryption for device 106 is in process can be set at one time (and/or by one computing device or other entity), and a second assertion indicating that encryption for device 106 is completed can be set at a different time (and/or by a different computing device or other entity).

Additionally, it should be noted that although the secondary access control state 114 is discussed above as being obtained by control module 102 from device 106, alternatively secondary access control state 114 can be obtained elsewhere. For example, secondary access control state 114 can be maintained by control module 102, obtained from an operating system registry or other record, can be obtained from a remote device, and so forth.

Figure 2:
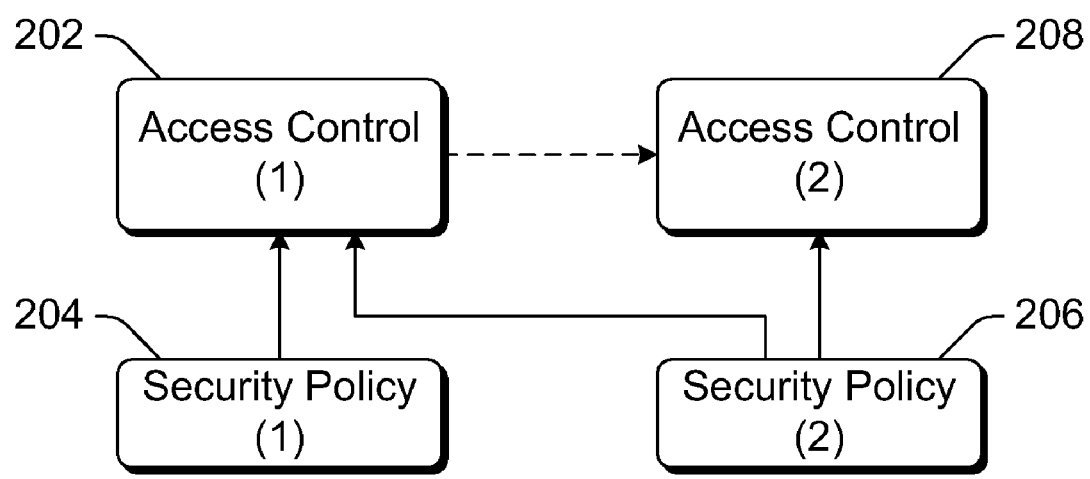
FIG. 2 illustrates an example system implementing the access control state determination based on security policy and secondary access control state in accordance with one or more embodiments.

FIG. 2 illustrates an example system 200 implementing the access control state determination based on security policy and secondary access control state in accordance with one or more embodiments. In system 200, a current access control 202 imposed by access guard 104 of FIG. 1 is determined based on both a security policy 204 and a security policy 206. Policy 204 can be, for example, the current security policy 110 of FIG. 1. The secondary access state of a device represents a policy previously imposed on the device, shown as policy 206. Accordingly, it can be seen that multiple different policies are combined and used to determine the access state for the device. These different policies can be viewed as being cascaded, building on one another to allow the access state for the device to be determined.

A second access control 208 can also be imposed using policy 206. This second access control 208 can be imposed by access guard 104 of FIG. 1, such as at a different time than access control 202 is imposed. Alternatively, this second access control can be imposed by a different access guard than imposes access control 202.

Although only security two policies 204 and 206 are illustrated in system 200, it is to be appreciated that alternatively three or more policies can be combined and used to determine the access state for the device. As discussed above, these different policies can be applied to generate the secondary access state at different times and/or by different devices or other entities. For example, different security policies at different times can set different assertions in a secondary access control state vector SAS(n).

Figure 3:
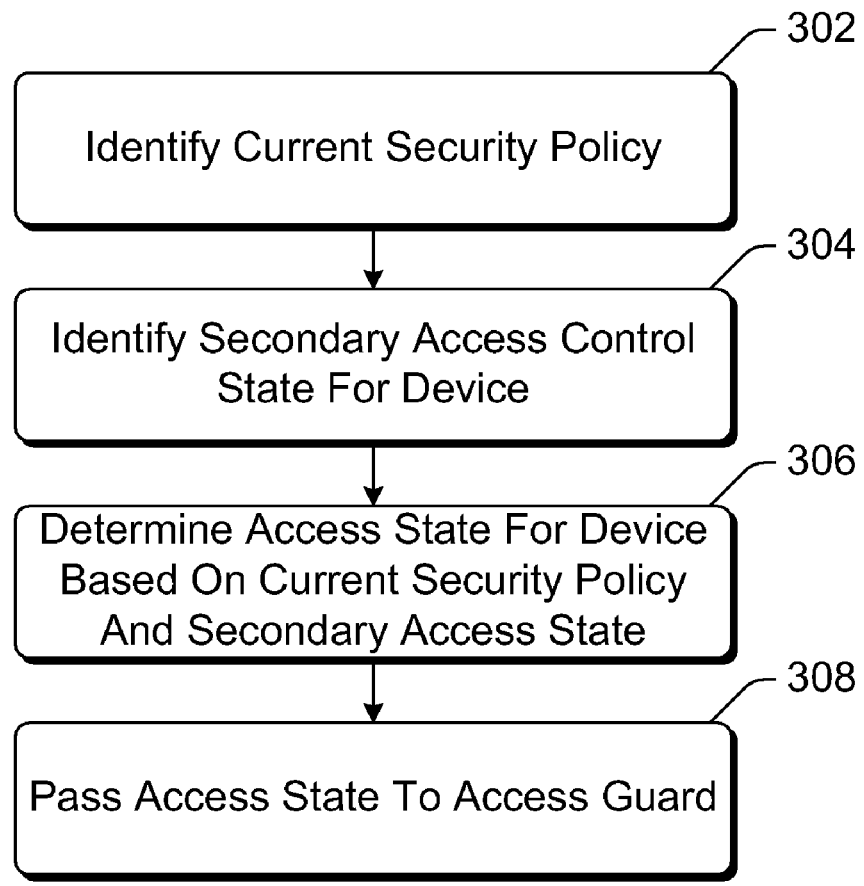
FIG. 3 is a flowchart illustrating an example process for implementing access control state determination based on security policy and secondary access control state in accordance with one or more embodiments.

FIG. 3 is a flowchart illustrating an example process 300 for implementing access control state determination based on security policy and secondary access control state in accordance with one or more embodiments. Process 300 is carried out by a component or module of a computing device, such as control module 102 of FIG. 1, and can be implemented in software, firmware, hardware, or combinations thereof. Process 300 is an example process for access control state determination based on security policy and secondary access control state; additional discussions of access control state determination based on security policy and secondary access control state are included herein with reference to different figures.

In process 300, a current security policy is identified (act 302). This current security policy refers to the current security policy being enforced on the computing device implementing process 300.

A secondary access control state for the device is also identified (act 304). As discussed above, this secondary access control state is the result of a previous security policy having been applied to the device.

An access state for the device is determined based on both the identified current security policy and the identified secondary access control state for the device (act 306). This access state is passed to an access guard (act 308) to be used to control access to the device as discussed above. Alternatively, process 300 can be implemented in an access guard, in which case act 308 need not be performed as the access guard is determining the access state.

Process 300 can be performed at different times and in response to different events. In one or more embodiments, the device for which the access state is being determined is a removable storage device, and the computing device implementing process 300 is performed each time the removable storage device is inserted into (or otherwise coupled to, put in communication with, or mounted in) the system. In other embodiments, process 300 is performed in response to other events, such as a change in the secondary access state for a device (e.g., when encryption of the device is completed), a change in the current security policy, and so forth.

Figure 4:
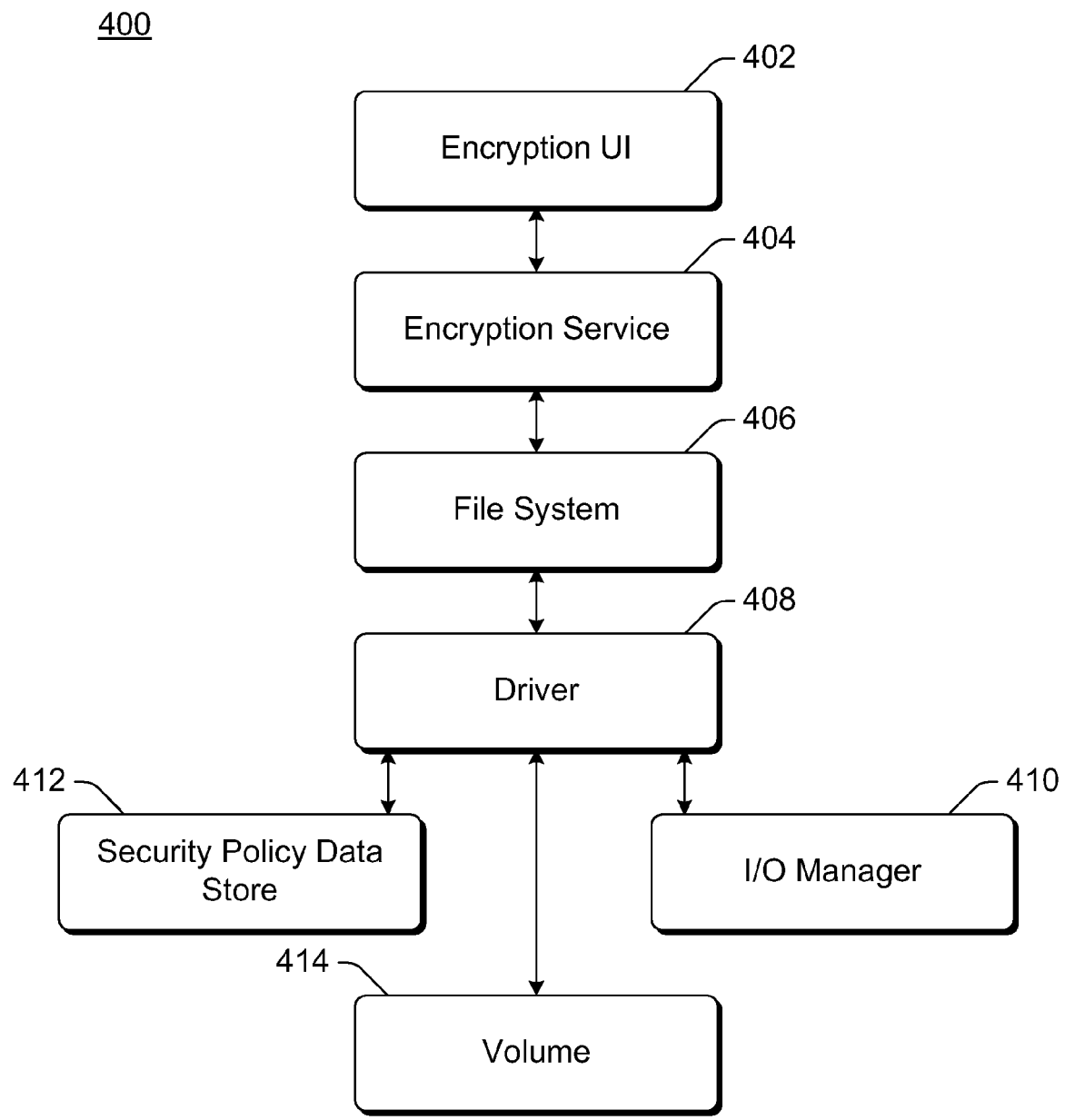
FIG. 4 is a block diagram illustrating an example system employing the access control state determination based on security policy and secondary access control state in accordance with one or more embodiments.

FIG. 4 is a block diagram illustrating an example system 400 employing the access control state determination based on security policy and secondary access control state in accordance with one or more embodiments. System 400 illustrates an example of the access control state determination based on security policy and secondary access control state in which the volume is a storage device that is encrypted, such as using the BitLocker™ Drive Encryption encryption mechanism. In system 400, an application or other component or module requesting access to a volume 414 is granted either read-only access or read-write access to volume 414.

System 400 includes multiple components or modules, illustrated as encryption user interface (UI) module 402, encryption service 404, file system 406, driver 408, input/output (I/O) manager 410, security policy data store 412, and volume 414. Volume 414 can be, for example, a device 106 of FIG. 1. Although multiple components or modules are illustrated individually in system 400, it is to be appreciated that the functionality of one or more of these components or modules can be combined into a single component or module. Similarly, it is to be appreciated that the functionality of one or more of these components or modules can be separated into two or more components or modules.

In one or more embodiments, system 400 is implemented in a computing device supporting different modes, such as a user mode and a kernel mode. In such embodiments, components or modules 408, 410, and 412 can be implemented in kernel mode, while components or modules 402 and 404 can be implemented in user mode, and file system 406 can bridge both user and kernel modes. However, it is to be appreciated that in other embodiments components or modules 402, 404, 408, 410, and 412, and/or file system 406, can be implemented in different modes. Additionally, the computing device can support different privilege levels, rings, or sessions. In such implementations, modules or components 404-410 can be implemented in a more privileged session (e.g., session 0), while encryption UI 402 can optionally be implemented in a less privileged session (e.g., session 1 or higher).

During operation, when a new volume 414 is introduced to system 400, I/O manager 410 detects the presence of volume 414. Volume 414 can be introduced to system 400 in a variety of different manners, such as inserting volume 414 into a receptacle or port of a computing device, powering on or otherwise enabling volume 414, wirelessly connecting volume 414 to a computing device, and so forth. I/O manager 410 informs driver 408 of new volume 414 when detected.

Driver 408 obtains the secondary access control state for volume 414. As discussed above, the secondary access control state can be obtained from volume 414, or alternatively obtained elsewhere. Driver 408 also obtains the current security policy from security policy data store 412. Based on both the current security policy and the secondary access control state for volume 414, driver 408 determines the access state for volume 414 as discussed above.

Driver 408 informs file system 406 of the access state for volume 414. An access guard is included as part of, or works in conjunction with, file system 406 in order to restrict access to volume 414 in accordance with the access state for volume 414. File system 406 also communicates with encryption service 404, allowing various aspects of the encryption of volume 414 to be altered. In one or more embodiments, encryption service 404 communicates with encryption UI module 402, which displays a UI allowing a user of system 400 to alter the encryption of volume 414. This alteration can include, for example, the user requesting that volume 414 be encrypted (e.g., that encryption be turned on) or the user requesting that volume 414 no longer be encrypted (e.g., that encryption be turned off).

Such alterations to the encryption of volume 414 can result in changes to the secondary access control state of volume 414. Accordingly, after such changes to the encryption of volume 414, driver 408 can obtain the new secondary access control state of volume 414. Based on this new secondary access control state of volume 414, and the current security policy, driver 408 determines a new access state for volume 414 as discussed above.

Figure 5:
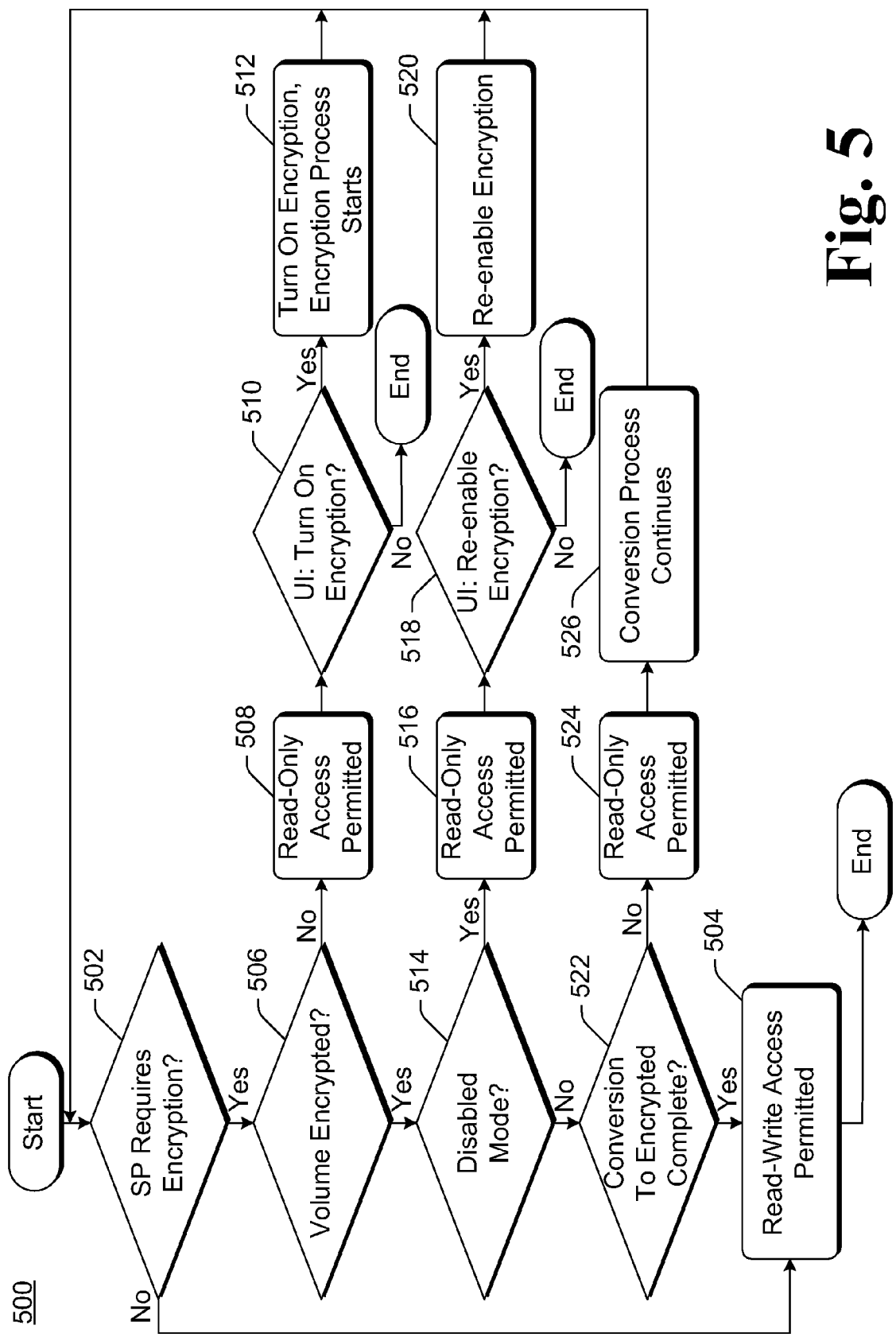
FIG. 5 is a flowchart illustrating an example process for implementing access control state determination based on security policy and secondary access control state in accordance with one or more embodiments.

FIG. 5 is a flowchart illustrating an example process 500 for implementing access control state determination based on security policy and secondary access control state in accordance with one or more embodiments. Process 500 is carried out by a component or module of a computing device, such as control module 102 of FIG. 1, and can be implemented in software, firmware, hardware, or combinations thereof. Process 500 is an example process for access control state determination based on security policy and secondary access control state; additional discussions of access control state determination based on security policy and secondary access control state are included herein with reference to different figures.

Process 500 illustrates an example of the access control state determination based on security policy and secondary access control state in which the volume is a storage device (e.g., a removable storage device) that can be encrypted, such as using the BitLocker™ Drive Encryption encryption mechanism. In process 500, an access state allows an application or other component or module requesting access to the storage device to be granted either read-only access or read-write access to the device. The determination of the access state (and thus which type of access to the storage device is permitted) is typically performed when the volume is mounted, although the determination can alternatively be made at other times.

When process 500 begins, a check is made as to whether the current security policy requires the volume to be encrypted (act 502). If the current security policy does not require the volume to be encrypted, then read-write access to the volume is permitted (act 504). However, if the current security policy requires the volume to be encrypted, then a check is made as to whether the volume is encrypted (act 506). This check can be made in a variety of different manners, such as by checking the secondary access control state of the volume. In one or more embodiments, this check is a check as to whether encryption is turned on for the volume. Situations can arise where the volume is in the process of being encrypted, but the encryption process is not completed yet. In such situations, encryption in act 506 is treated as being turned on for the volume.

If the volume is not encrypted, then read-only access to the volume is permitted (act 508). A user interface is then displayed or otherwise presented allowing a user to turn on encryption for the volume, and process 500 proceeds based on whether encryption for the volume is turned on. If the user does not request to have the volume encrypted (e.g., encryption is not turned on), then process 500 ends with read-only access being permitted (as set in act 508). However, if the user does request to have the volume encrypted (e.g., encryption is turned on), then encryption for the volume is turned on and the conversion process starts (act 512). The volume is converted by invoking an encryption module or component that manages encryption and decryption of the volume. During this conversion process, read-only access to the volume is permitted (as set in act 508). Process 500 then returns to act 502, where read-write access to the volume will be permitted when the conversion process is completed (and the device is not operating in disabled mode, as discussed below).

Returning to act 506, if the volume is encrypted, then a check is made as to whether the computing device implementing process 500 is operating in a disabled mode (act 514). Disabled mode is supported by some embodiments, allowing data to be stored in unencrypted form on the volume. In embodiments that do not support disabled mode, acts 514, 516, 518, and 520 can be removed from process 500. If the computing device is operating in a disabled mode, then read-only access to the volume is permitted (act 516). A user interface is then displayed or otherwise presented allowing a user to request that encryption of the volume be re-enabled, and process 500 proceeds based on whether re-enabling of the encryption is requested. If the user does not request to re-enable encryption for the volume, then process 500 ends with read-only access being permitted (as set in act 516). However, if the user does request to re-enable encryption for the volume, then encryption for the volume is re-enabled (act 520). This re-enabling of encryption results in disabled mode being turned off, so the computing device is no longer operating in disabled mode. Process 500 then returns to act 502, where read-write access to the volume will be permitted when the volume is encrypted and the computing device is no longer operating in disabled mode.

Returning to act 514, if the computing device is not operating in a disabled mode, or no disabled mode is supported, then a check is made as to whether conversion of the volume to an encrypted volume is completed (act 522). Situations can arise where the volume is being converted to being encrypted, but the conversion is not completed for some reason (e.g., a small amount of time has passed since the request to convert the volume to an encrypted volume was received, the computing device is powered off, the volume is removed from the computing device, the user requests to pause the conversion process, and so forth). The incomplete status of the conversion process can be identified in different manners. For example, the status of the conversion process can be identified in the secondary access control state, can be maintained by the component or module performing the conversion, can be maintained by some other component, module, or record, and so forth.

If conversion of the volume to an encrypted volume has been completed, then read-write access to the volume is permitted (act 504). However, if conversion of the volume to an encrypted volume has not been completed, then read-only access to the volume is permitted (act 524). The conversion process continues (act 526), with read-only access to the volume being permitted (as set in act 524). Process 500 then returns to act 502, where read-write access to the volume will be permitted when the conversion process is completed (and the device is not operating in disabled mode). A user interface can optionally be displayed or otherwise presented prior to act 526, allowing the user to indicate whether the conversion process is to continue. If the user requests that the conversion process continue, then the conversion process continues in act 526. However, if the user requests that the conversion process not continue, then process 500 ends with read-only access being permitted (as set in act 524).

Figure 6:
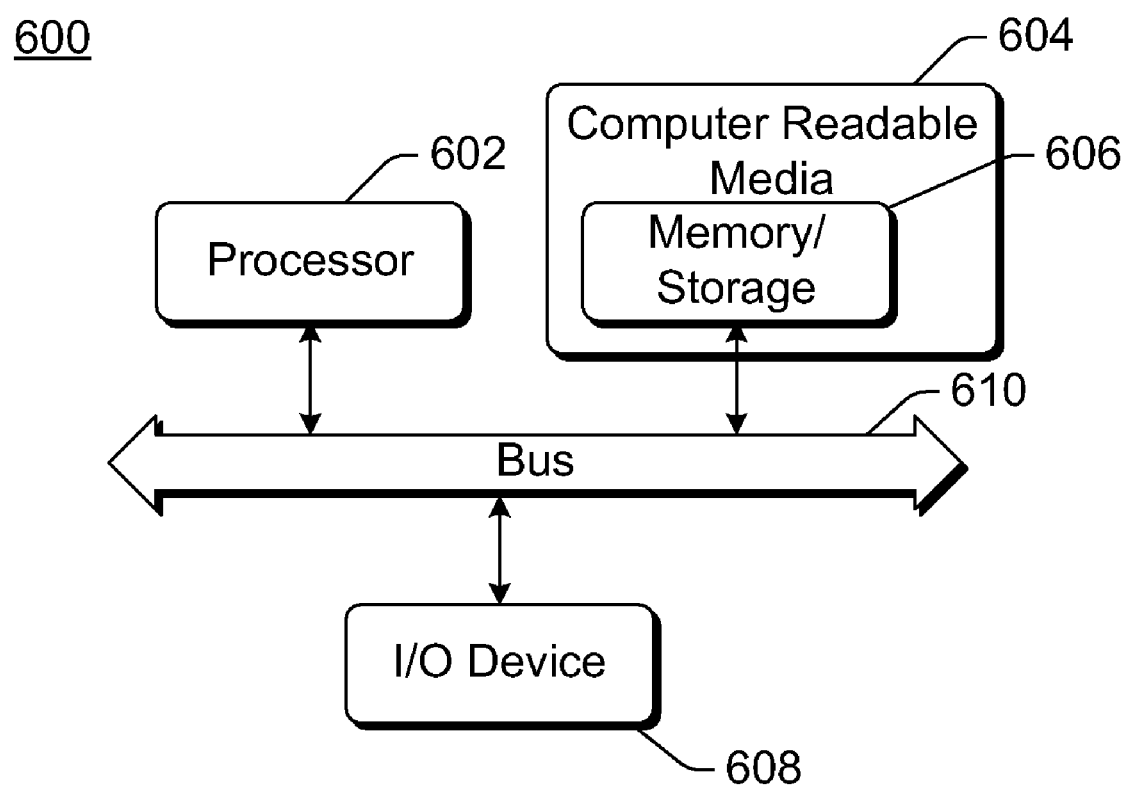
FIG. 6 illustrates an example computing device that can be configured to implement the access control state determination based on security policy and secondary access control state in accordance with one or more embodiments.

FIG. 6 illustrates an example computing device 600 that can be configured to implement the access control state determination based on security policy and secondary access control state in accordance with one or more embodiments. Computing device 600 can implement, for example, control module 102 and/or access guard 104 of FIG. 1.

Computing device 600 includes one or more processors or processing units 602, one or more computer readable media 604 which can include one or more memory and/or storage components 606, one or more input/output (I/O) devices 608, and a bus 610 that allows the various components and devices to communicate with one another. Computer readable media 604 and/or one or more I/O devices 608 can be included as part of, or alternatively may be coupled to, computing device 600. Bus 610 represents one or more of several types of bus structures, including a memory bus or memory controller, a peripheral bus, an accelerated graphics port, a processor or local bus, and so forth using a variety of different bus architectures. Bus 610 can include wired and/or wireless buses.

Memory/storage component 606 represents one or more computer storage media. Component 606 can include volatile media (such as random access memory (RAM)) and/or nonvolatile media (such as read only memory (ROM), Flash memory, optical disks, magnetic disks, and so forth). Component 606 can include fixed media (e.g., RAM, ROM, a fixed hard drive, etc.) as well as removable media (e.g., a Flash memory drive, a removable hard drive, an optical disk, and so forth).

The techniques discussed herein can be implemented in software, with instructions being executed by one or more processing units 602. It is to be appreciated that different instructions can be stored in different components of computing device 600, such as in a processing unit 602, in various cache memories of a processing unit 602, in other cache memories of device 600 (not shown), on other computer readable media, and so forth. Additionally, it is to be appreciated that the location where instructions are stored in computing device 600 can change over time.

One or more input/output devices 608 allow a user to enter commands and information to computing device 600, and also allows information to be presented to the user and/or other components or devices. Examples of input devices include a keyboard, a cursor control device (e.g., a mouse), a microphone, a scanner, and so forth. Examples of output devices include a display device (e.g., a monitor or projector), speakers, a printer, a network card, and so forth.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media can be any available medium or media that can be accessed by a computing device. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embody computer readable instructions, data structures, program modules, or other data in a modulated data signal, such as carrier wave or other transport mechanism. Communication media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media. Combinations of any of the above are also included within the scope of computer readable media.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component logic represents program code that performs specified tasks when executed on a processor (e.g., CPU or CPUs). The program code can be stored in one or more computer readable media, further description of which can be found with reference to FIG. 6. The features of the access control state determination based on security policy and secondary access control state techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing device, the method comprising:
   identifying a current security policy for accessing a device of the computing device;
   identifying a secondary access control state vector for the device, the secondary access control state vector being a result of a previous application of a different security policy, the secondary access control state vector comprising multiple vector elements, each of the multiple vector elements comprising a secondary access control state assertion, and the secondary access control state assertions comprising at least two of:
   an indication that encryption is turned on for the device,
   an indication that encryption is turned off for the device,
   an indication that encryption of the device has been completed,
   an indication that encryption of the device is in process, an indication of particular users or groups of users that are permitted to access the device, and an indication of particular users or groups of users that are prohibited from accessing the device; and determining an access state for the device by applying the current security policy to the secondary access control state vector to generate the access state.

2. A method as recited in claim 1, wherein the device comprises a storage device.

3. A method as recited in claim 2, further comprising determining the access state in response to the storage device being inserted into the computing device.

4. A method as recited in claim 1, further comprising passing the access state to an access guard for use by the access guard in controlling access to the device.

5. A method as recited in claim 1, the identifying the secondary access control state vector comprising obtaining the secondary access control state vector from the device.

6. A method as recited in claim 1, wherein the secondary access control state vector is a result of previous applications of multiple different security policies.

7. One or more computer storage devices having stored thereon multiple instructions that, when executed by one or more processors of a computing device, cause the one or more processors to:

identify a secondary access control state vector of a volume coupled to the computing device, the secondary access control state vector comprising multiple vector elements, each of the multiple vector elements comprising a secondary access control state assertion, the secondary access control state assertions comprising at least two of:

an indication that encryption is turned on for the volume, an indication that encryption is turned off for the volume, an indication that encryption of the volume has been completed, an indication that encryption of the volume is in process, an indication of particular users or groups of users that are permitted to access the volume, and an indication of particular users or groups of users that are prohibited from accessing the volume;

identify a current security policy of the computing device; and apply the current security policy of the computing device to the secondary access control state vector of the volume to determine an access state for the volume.

8. One or more computer storage devices as recited in claim 7, the secondary access control state vector being a result of a second security policy previously applied to the volume.

9. One or more computer storage devices as recited in claim 7, wherein to identify the secondary access control state vector is to retrieve the secondary access control state vector from the volume.

10. One or more computer storage devices as recited in claim 7, wherein the volume comprises a storage device.

11. One or more computer storage devices as recited in claim 10, wherein the secondary access control state vector further indicates whether the volume has been encrypted using a volume-based encryption mechanism, the secondary access control state vector is stored on the storage device, and the determination is made when the storage device is coupled to the computing device.

12. One or more computer storage devices as recited in claim 7, the instructions further causing the one or more processors to forward the access state to an access guard for use by the access guard in controlling access to the volume.

13. A device comprising:

a control module to obtain a current security policy for the device and a secondary access control state vector for a volume coupled to the device, and further to determine an access state by applying the current security policy of the device to the secondary access control state vector of the volume to generate the access state, the secondary access control state vector comprising multiple vector elements, each of the multiple vector elements comprising a secondary access control state assertion, the secondary access control state assertions comprising at least two of:

an indication that encryption is turned on for the volume, an indication that encryption is turned off for the volume, an indication that encryption of the volume has been completed, an indication that encryption of the volume is in process, an indication of particular users or groups of users that are permitted to access the volume, and an indication of particular users or groups of users that are prohibited from accessing the volume; and an access guard to receive the access state from the control module, and to control access to the volume based on the access state.

14. A device as recited in claim 13, the secondary access control state vector being a result of a second security policy previously applied to the volume.

15. A device as recited in claim 13, wherein the secondary access control state vector is stored on the volume.

16. A device as recited in claim 13, wherein the volume comprises a flash memory device.

17. A device as recited in claim 13, wherein the access guard permits either a read-only access to the volume or a read-write access to the volume.

18. A device as recited in claim 13, wherein the secondary access control state vector for the volume indicates whether the volume is encrypted.

19. A device as recited in claim 13, the secondary access control state vector being a result of previous applications of multiple different security policies to the volume.

20. A method as recited in claim 1, wherein the secondary access control state vector comprises the indication that encryption of the device has been completed and the indication that encryption of the device is in process.

* * * * *